July 12, 1938.     K. MOEGER     2,123,376
MEASURING INSTRUMENT
Filed Sept. 11, 1936
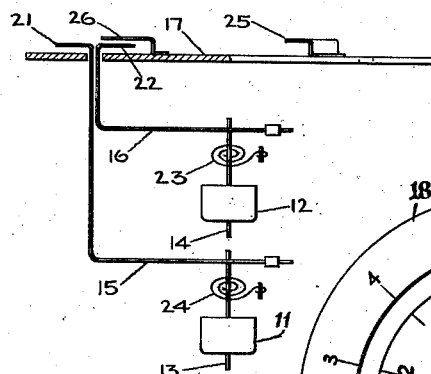
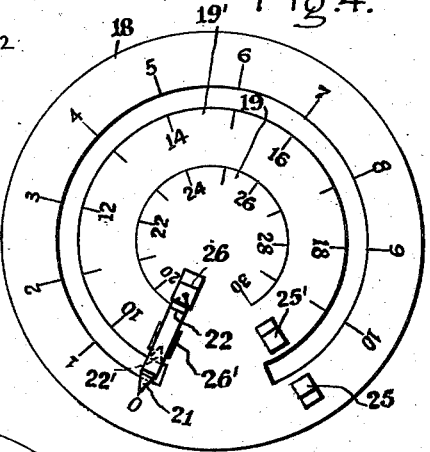
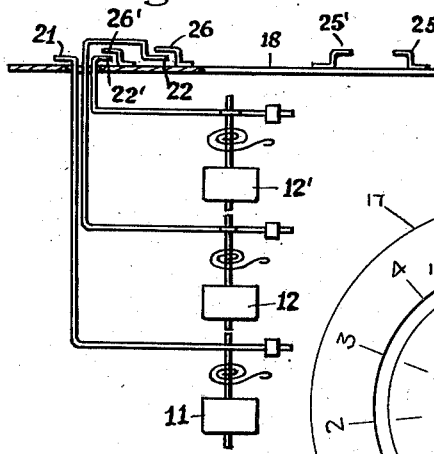
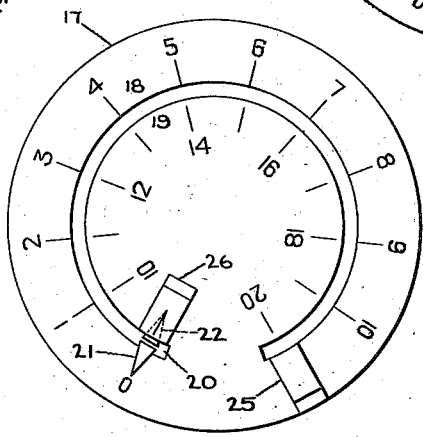
Inventor:
Kurt Moeger,
by Harry E. Dunham
His Attorney.

Patented July 12, 1938

2,123,376

UNITED STATES PATENT OFFICE 2,123,376

MEASURING INSTRUMENT

Kurt Moeger, Berlin, Germany, assignor to General Electric Company, a corporation of New York Application September 11, 1936, Serial No. 100,376
In Germany October 9, 1935

2 Claims. (Cl. 73—151)

My invention relates to measuring instruments and has for its principal object the provision of apparatus for indicating over a large measuring range without congestion of the scale.

It is also an object of my invention to provide a simple, reliable arrangement embracing a plurality of deflecting systems which come into operation in succession and are provided with means for eliminating the possibility of confusion between the indications of the separate measuring systems.

Other and further objects and advantages will become apparent as the description proceeds.

The invention may be understood more readily from the following detailed description when considered in connection with the accompanying drawing, and those features of the invention which are believed to be novel and patentable will be pointed out in the claims appended hereto. In the drawing, Fig. 1 is a schematic diagram showing one embodiment of my invention in elevation and partially in section; Fig. 2 is a plan view of the apparatus of Fig. 1; Fig. 3 is a schematic diagram showing in elevation and partially in section a modified embodiment for obtaining a still greater measurement range than the embodiment of Figs. 1 and 2; and Fig. 4 is a plan view of the apparatus of Fig. 3. Like reference characters are utilized in the drawing to designate like parts throughout.

Referring now more in detail to the drawing, I provide a plurality of rotatable measuring systems 11 and 12, which may be of any desired type, for example, electrical instrument mechanisms of the d'Arsonval type and connected in parallel or otherwise to measure the same quantity at different values. The measuring systems 11 and 12 are preferably coaxial, being shown with rotatable spindles 13 and 14 lying along the same line. The shafts 13 and 14 carry deflecting arms 15 and 16, respectively, and a scale plate 17 is provided having marked thereon a plurality of scales 18 and 19 cooperating with the deflecting arms 15 and 16, respectively. The apparatus shown by way of illustration has an annular slot 20 extending nearly around the scale plate 17 and preferably at least 270 degrees in length. The deflecting arms are so arranged as to project through the slot 20 with sufficient clearance to avoid interference, and the arms 15 and 16 carry indices 21 and 22 extending outwardly and inwardly to cooperate with scales 18 and 19 respectively. It will be understood that the deflecting elements 11 and 12 are preferably of the long-scale type providing deflections of approximately 270 degrees. In Fig. 1, the right hand scale portion is a front elevation corresponding to the plan view of Fig. 2; but the left hand scale portion is represented as a section cut by a radial plane through the zero point of the scale, and the pointers 15 and 16 are also represented in a corresponding elevational view.

One of the scales, for example, scale 18, is graduated from zero to a predetermined value, for example, the value 10, and the other scale 19 is marked with numerals extending from the highest numeral of the scale 18, in this case, the numeral 10, to another predetermined higher value, for example, the value 20. The deflecting system 12 is of the suppressed-zero type so that it does not begin to deflect until the measured quantity reaches a value slightly below the value 10. Zero suppression may be accomplished in any desired manner, for example, by providing a biasing spring 23 of such strength and so adjusted with respect to the biasing spring 24 of the system 11 that the system 11 deflects from zero to the value a little over 10 and the system 12 deflects from a value a little below 10 to the value 20. Thus the measuring apparatus has in effect a 540 degree length of scale.

Although, for the sake of illustration, I have described my invention in connection with two measuring systems and with the complete scale divided into two parts, it will be understood that my invention is not limited to this specific arrangement and that any desired number of deflecting systems and corresponding scale ranges may be provided in order to obtain the desired total length of scale. For example, for using three scale ranges to cover measurements from 0 to 30, an additional scale 19' may be added between the scales 18 and 19 and connected therewith, as shown in Figs. 3 and 4. Cooperating with the scale 19' is the pointer index 22' of a suppressed zero measuring system 12'. It will likewise be apparent that my invention is not limited to the specific arrangement shown for overlapping the separate deflecting arms 15 and 16.

In order to avoid confusion as to which scale is to be read, I prefer to provide shields 25 and 26 for covering the indices 21 and 22 when the corresponding deflecting systems are in the inactive position. For example, when the measured value is below 10 and the system 12 has not started to deflect, the index 22 is covered by the shield 26 so that the index 21 is the only index visible and the readings will be taken on the scale 18. On the other hand, when the measured value goes above 10, the index 21 moves under the shield 25 so as to conceal the index 21 and leaves only the index 22 visible, which will then occupy some position between 10 and 20 and cause the readings to be taken on the scale 19. In the embodiment of Figs. 3 and 4, corresponding to the upper-end-of-scale shield 25 of Figs. 1 and 2, there is a shield 25' associated with the intermediate scale 19' to conceal the index 22' when the measured value exceeds 20 and, corresponding to the lower-end-of-scale shield 26 of Figs. 1 and 2, there is a shield 26' associated with the intermediate scale 19' to conceal the index 22' when the measured value is less than 10. In Fig. 3 the left hand scale portion is represented as a section cut by a radial plane through the zero point of the outer scale and through the shields 26 and 26', and the measuring systems 11, 12 and 12' are represented in a corresponding elevational view; but the right hand scale portion and the shields 25 and 25' are represented as seen from such an angle as to give a full side view of the shields 25 and 25'.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:—

1. Long-scale measuring apparatus comprising in combination, a scale plate having an annular slot therein, and a pair of rotatable deflecting elements with pivot axes substantially coaxial with said annular slot and carrying deflecting arms extending through said slot, said scale plate having scale divisions and markings thereon on either side of said annular slot and said deflecting arms each having an index, one of which extends inwardly to cooperate with one of said scales and the other of which extends outwardly to cooperate with the other of said scales, one of said deflecting elements being of the suppressed-zero type and the scale cooperating therewith having a lower scale value corresponding substantially with the upper scale value of the other scale.

2. Long-range measuring apparatus comprising in combination, a plurality of deflecting elements each carrying a deflecting index, a plurality of scales each cooperating with one of said indices, said scales having graduations progressively marked in series so that the maximum scale value of one scale corresponds substantially with the minimum scale value of the next, and shields on said scales beyond the marked graduations for covering said indices when in a position beyond the graduations of the respective corresponding scales, each of said deflecting elements with the exception of the one cooperating with the first scale being of the suppressed-zero type with means for preventing deflection until the measured value equals substantially the minimum scale value of the scale cooperating with the deflecting element.

KURT MOEGER.